United States Patent [19]
Schaper

[11] Patent Number: 5,934,397
[45] Date of Patent: Aug. 10, 1999

[54] MODULAR LAND VEHICLE

[76] Inventor: Douglas Schaper, 16A Martha's Way, Edgartown, Mass. 02539

[21] Appl. No.: 08/790,154

[22] Filed: Jan. 28, 1997

[51] Int. Cl.[6] ........................................................ B60K 1/00
[52] U.S. Cl. .......................... 180/65.2; 180/294; 180/312
[58] Field of Search .................................... 180/298, 288, 180/299, 294, 65.1, 313, 65.2, 65.3, 65.4, 65.5, 65.6, 312, 58, 60, 31; 296/197, 205, 196; 477/5, 7, 8, 14

[56] References Cited

U.S. PATENT DOCUMENTS

| | | | |
|---|---|---|---|
| 2,127,032 | 8/1938 | Johnston et al. | 180/312 |
| 3,874,472 | 4/1975 | Deane | 180/65.1 |
| 4,027,737 | 6/1977 | Garry . | |
| 4,422,685 | 12/1983 | Bonfilio et al. | 216/197 |
| 4,534,442 | 8/1985 | Botar | 180/298 |
| 4,535,867 | 8/1985 | Botar | 180/298 |
| 4,842,326 | 6/1989 | DiVito | 296/196 |
| 4,900,083 | 2/1990 | Kumasaka et al. | 296/197 |
| 4,968,087 | 11/1990 | Goria | 296/197 |
| 5,129,300 | 7/1992 | Trevisan et al. | 296/196 |
| 5,213,386 | 5/1993 | Janotik et al. | 296/205 |
| 5,251,721 | 10/1993 | Ortenheim | 180/298 |

*Primary Examiner*—Richard M. Camby
*Attorney, Agent, or Firm*—Darby & Darby

[57] ABSTRACT

A modular vehicle includes a frame having three main sections; a front section, a rear section and a center section. The front and rear sections may be displaced vertically with respect to center section prior to being assembled. Each section is separately assembled and standardized so that various devices may be incorporated to each section and each section may be otherwise modified to allow a specific vehicle to be easily and quickly manufactured.

Another aspect of the invention is a drive assembly that includes at least two electric motors, each having different operating characteristics. Each motor is connected to a common drive shaft through a controllable clutch. A drive system controller selectively activates each motor in response to power demand, as determined by a relative position of an accelerator pedal, by engaging the clutch of a selected motor and simultaneously providing power to the selected motor.

Another aspect of the invention is a quick-release wheel assembly that includes a rim having an inner wall which defines an adjacent central opening. The opening is sized and shaped to snugly receive a cylindrical hub so that the inner wall lies flush to an outer wall surface of the hub. Radially directed pins are positionable through both inner wall and outer wall surface of the hub so that the wheel may be selectively engaged to the hub.

17 Claims, 10 Drawing Sheets

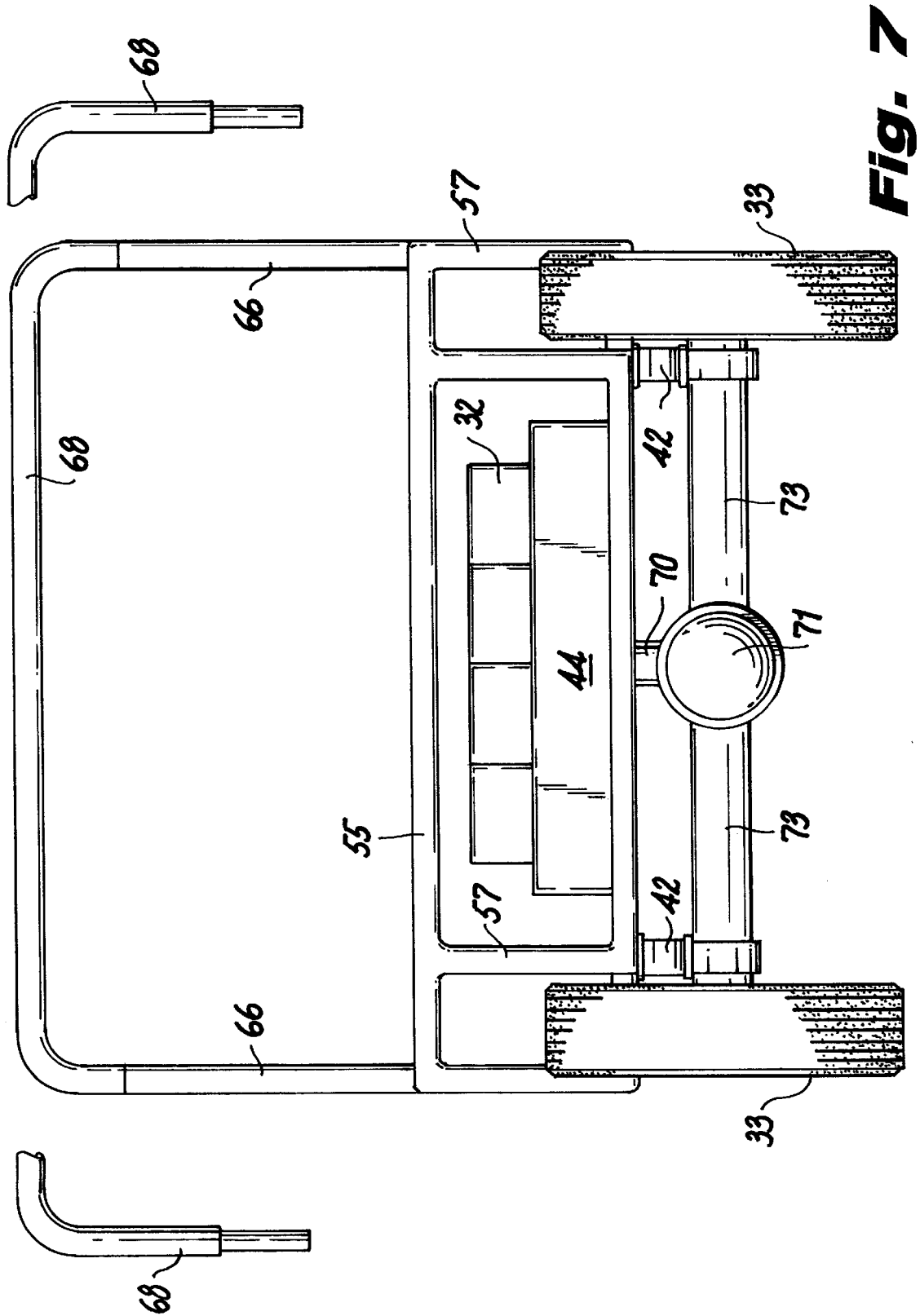

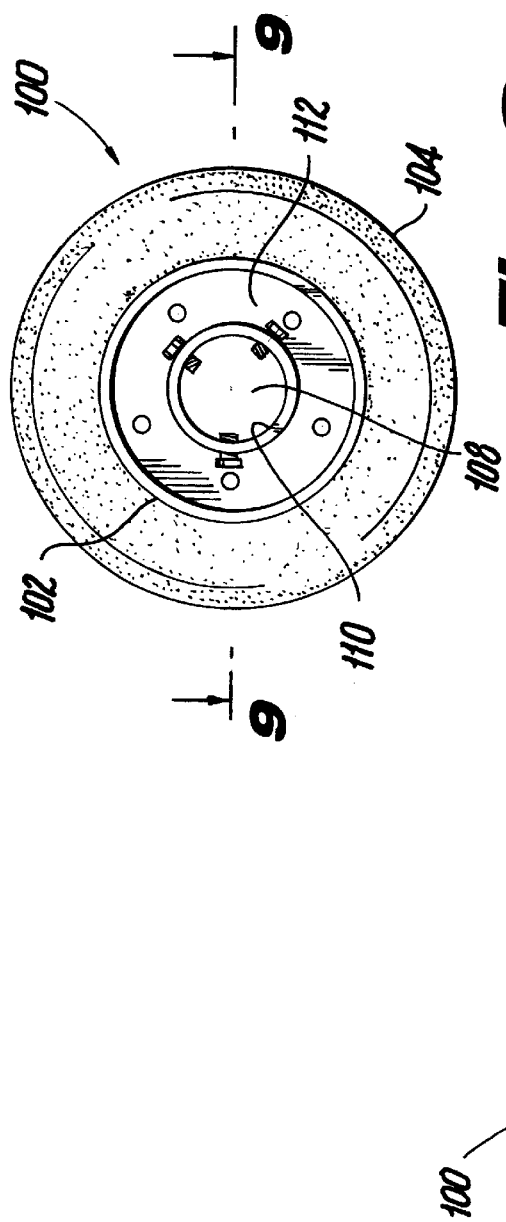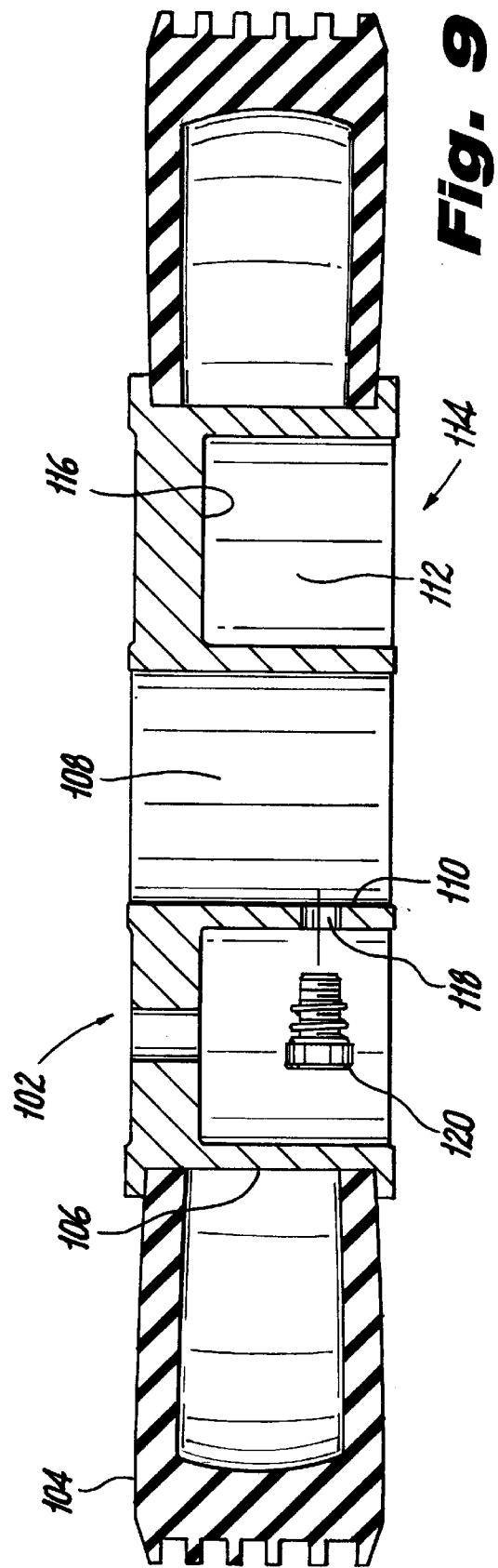

MODULAR LAND VEHICLE

BACKGROUND OF THE INVENTION

1) Field of the Invention

The present invention generally relates to land vehicles, and more particularly, to modular land vehicles.

2) Description of the Prior Art

The major elements of an automobile include: a chassis; a drive train; a motor or engine; running gear; and a body. The body generally includes an enclosed cab from which an operator sits and operates the automobile. The motor or engine is used to convert a source of energy (such as electric power stored in batteries, or fuel stored in a tank) to mechanical rotation. The drive train applies the newly generated mechanical rotation of the engine to the wheels of the automobile, through a transmission which effectively controls the rotational speed and power reaching the wheels. The running gear includes brakes, suspension, wheels and wheel bearings, and a steering assembly. The chassis supports all of the components of the automobile and is generally made from a variety of pre-shaped panels welded together and further welded to structurally rigid members. Although a particular chassis may be designed to fit any of several models of automobiles of a particular make (such as a Ford light-pickup truck chassis may also be used with a Ford sedan and perhaps even a Ford sports car model) the chassis itself is not intended to be modified or adjusted after a particular manufactured automobile is complete. Even during the construction of a particular automobile, the chassis may not be altered from its original design to accommodate any of a variety of custom applications, typically desired by a customer. Instead of an automobile being built around the requirements of a customer, the customer must conform his or her needs to a particular automobile that has already been designed and built.

The automotive industry has recognized that not all automobiles they design will satisfy every customer and has made attempts to offer "fine-tuning" of pre-designed models through optional equipment wherein a customer may choose among specific ancillary items of a particular automobile, such as the inclusion of a radio, a cassette player, air-conditioning, power locks, and power windows. Unfortunately, such optional equipment does not include modifications of any of the major elements of the automobile and therefore, it is likely that the customer will not receive a vehicle that sufficiently meets his or her needs.

U.S. Pat. Nos: 3,874,472; 4,422,685; 4,900,083; 5,129,700; 4,968,087; 5,213,386; and 4,842,326 disclose land vehicles that include modular elements and electrically powered motors. These patents are hereby incorporated by reference.

Apart from the problems associated with the lack of modularity of commercially available automobiles, the automobiles of the prior art suffer the following problems:

a) They are expensive to manufacture;
b) They include very complex operating systems and components;
c) They require a tremendous amount of resources to produce;
d) They accommodate and benefit the people of primarily developed countries;
e) They include manufacturing procedures that are inflexible and incapable of meeting the specific needs of the customer; and
f) They cannot be easily modified or adapted to meet the specific needs of the customer or operating environment.

It is an object of the invention to provide a modular automobile whose major components may be exchanged and adjusted on a per-car basis to accommodate the specific requirements of a customer.

It is another object of the invention to overcome the deficiencies of the prior art.

It is yet another object of the invention to provide a chassis that may be easily adjusted during and after the manufacture of a particular automobile.

It is yet another object of the invention to provide a variety of different types of land vehicles using readily interchangeable and relatively adjustable components.

It is another object of the invention to provide an inexpensive land vehicle that is easy to manufacture, easy to repair, and readily adaptable to a variety of operating environments.

SUMMARY OF THE INVENTION

In view of the foregoing, the main object of this invention is to provide a modular vehicle that includes a frame having three main sections; a front section, a rear section and a center section. The front and rear sections may be displaced vertically with respect to center section prior to being assembled. Each section is separately assembled and standardized so that various devices may be incorporated to each section and each section may be otherwise modified to allow a specific vehicle to be easily and quickly manufactured.

Another aspect of the invention is a drive assembly that includes at least two electric motors, each having different operating characteristics. Each motor is connected to a common drive shaft through a controllable clutch. A drive system controller selectively activates each motor in response to power demand, as determined by a relative position of an accelerator pedal, by engaging the clutch of a selected motor and simultaneously providing power to the selected motor.

Another aspect of the invention is a quick-release wheel assembly that includes a rim having an inner wall which defines an adjacent central opening. The opening is sized and shaped to snugly receive a cylindrical hub so that the inner wall lies flush to an outer wall surface of the hub. Radially directed pins are positionable through both inner wall and outer wall surface of the hub so that the wheel may be selectively engaged to the hub.

BRIEF DESCRIPTION OF THE DRAWINGS

FIG. 7 is a rear elevation view of the rear section, according to the invention, showing details of the batteries, a fuel tank, drive train, and suspension;

FIG. 8 is a front view of a wheel assembly, according to the invention;

FIG. 9 is a sectional side view of the wheel assembly, taken along the lines 9—9 of FIG. 8;

DETAILED DESCRIPTION OF THE PREFERRED EMBODIMENTS

Figure 1:
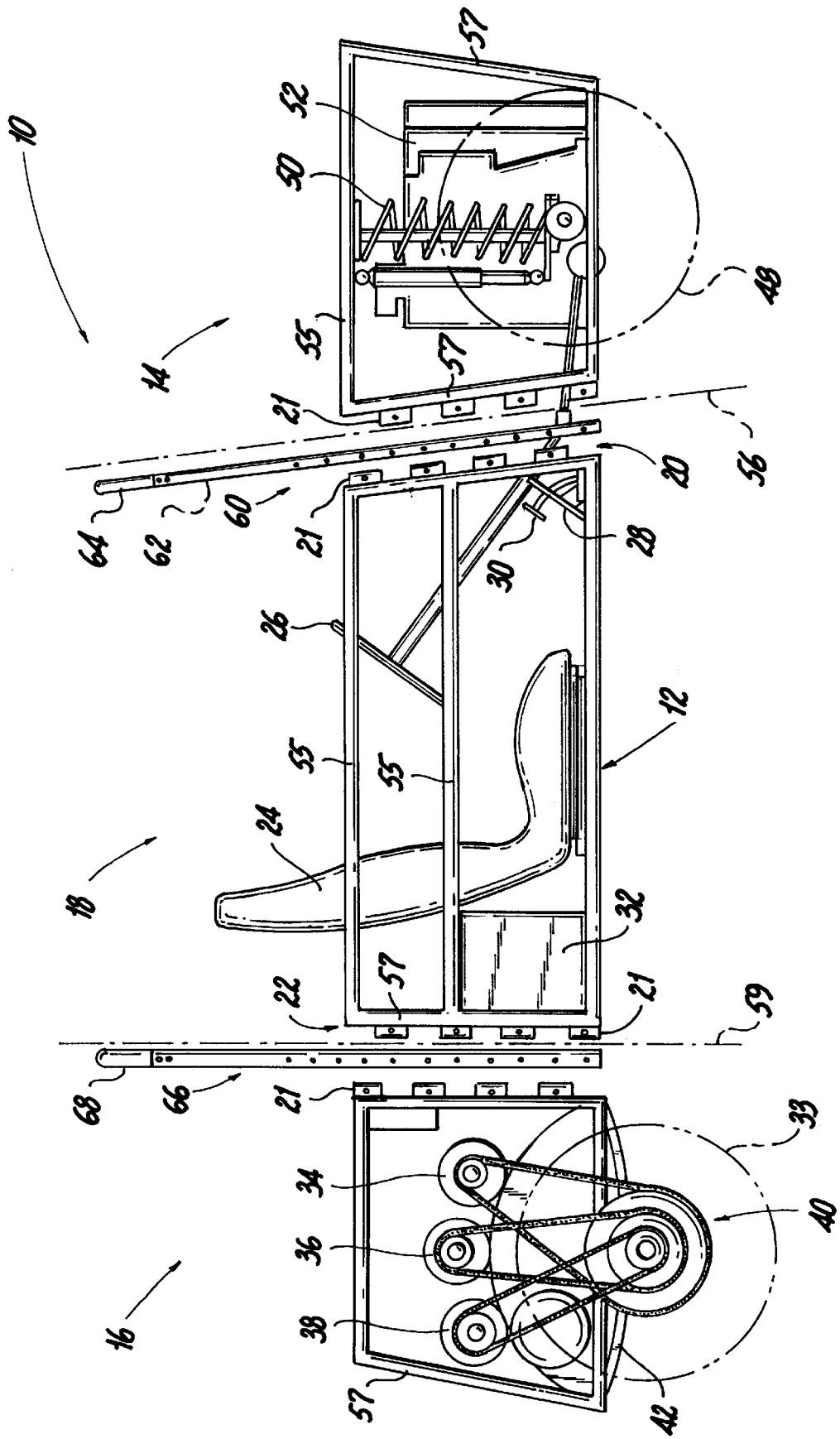
FIG. 1 is a side elevation view of a vehicle, according to the invention, showing a front, center and rear section prior to assembly.
Figure 2:
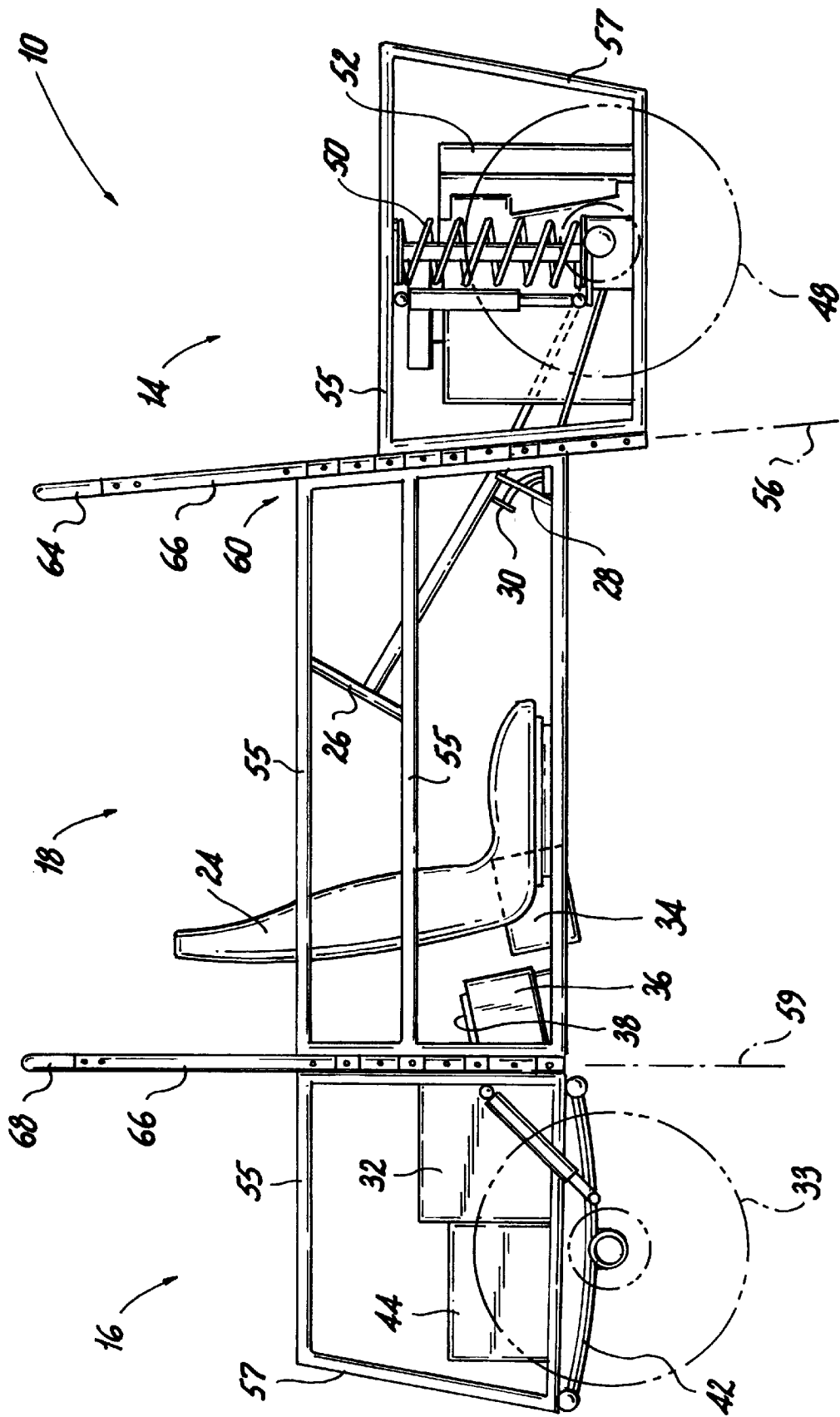
FIG. 2 is a side elevation view of the vehicle of FIG. 1, according to the invention, showing the front, center and rear sections attached to each other.
Figure 3:
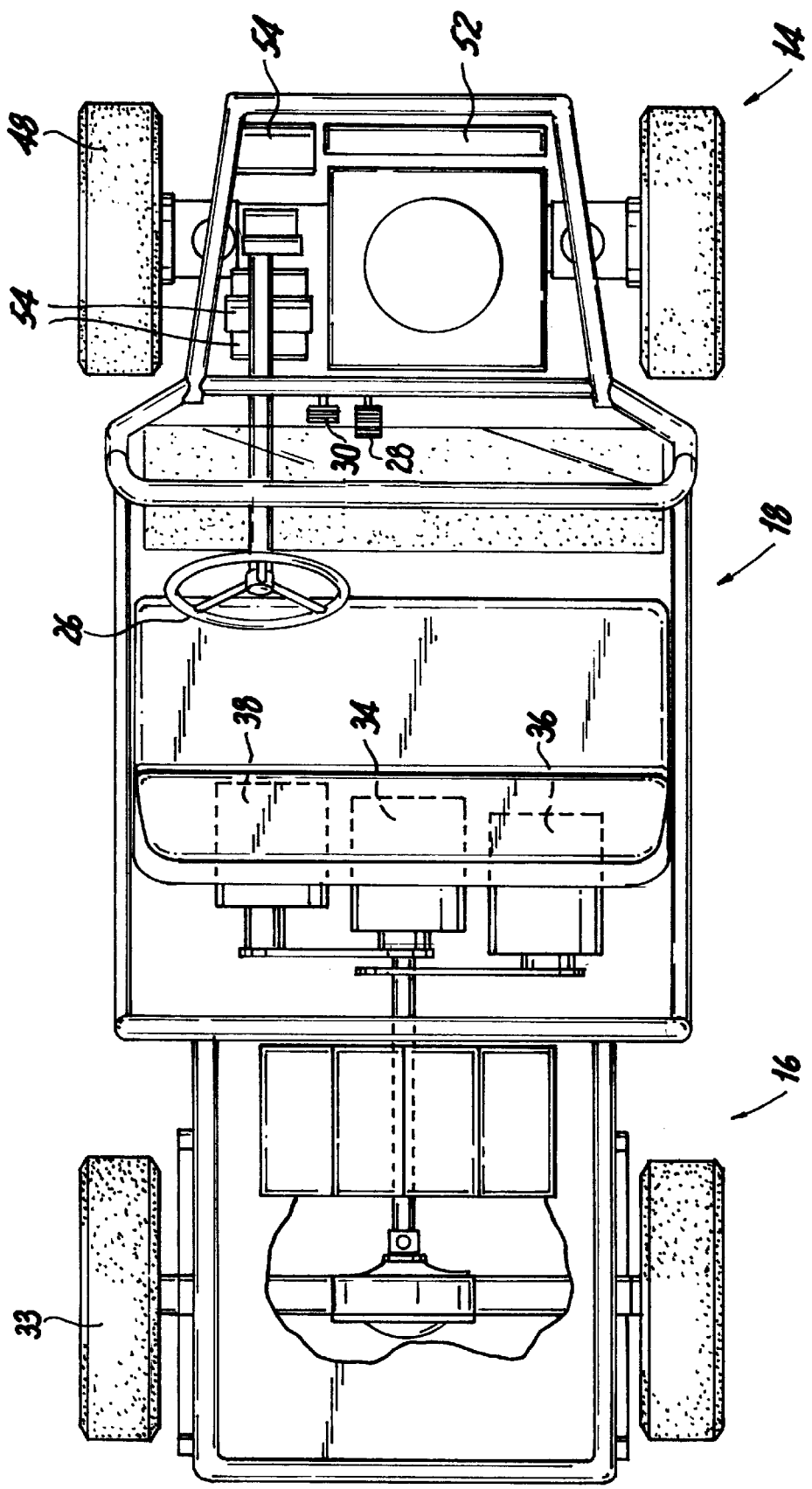
FIG. 3 is a top plan view of the vehicle of FIG. 2, according to the invention.
Figure 4:
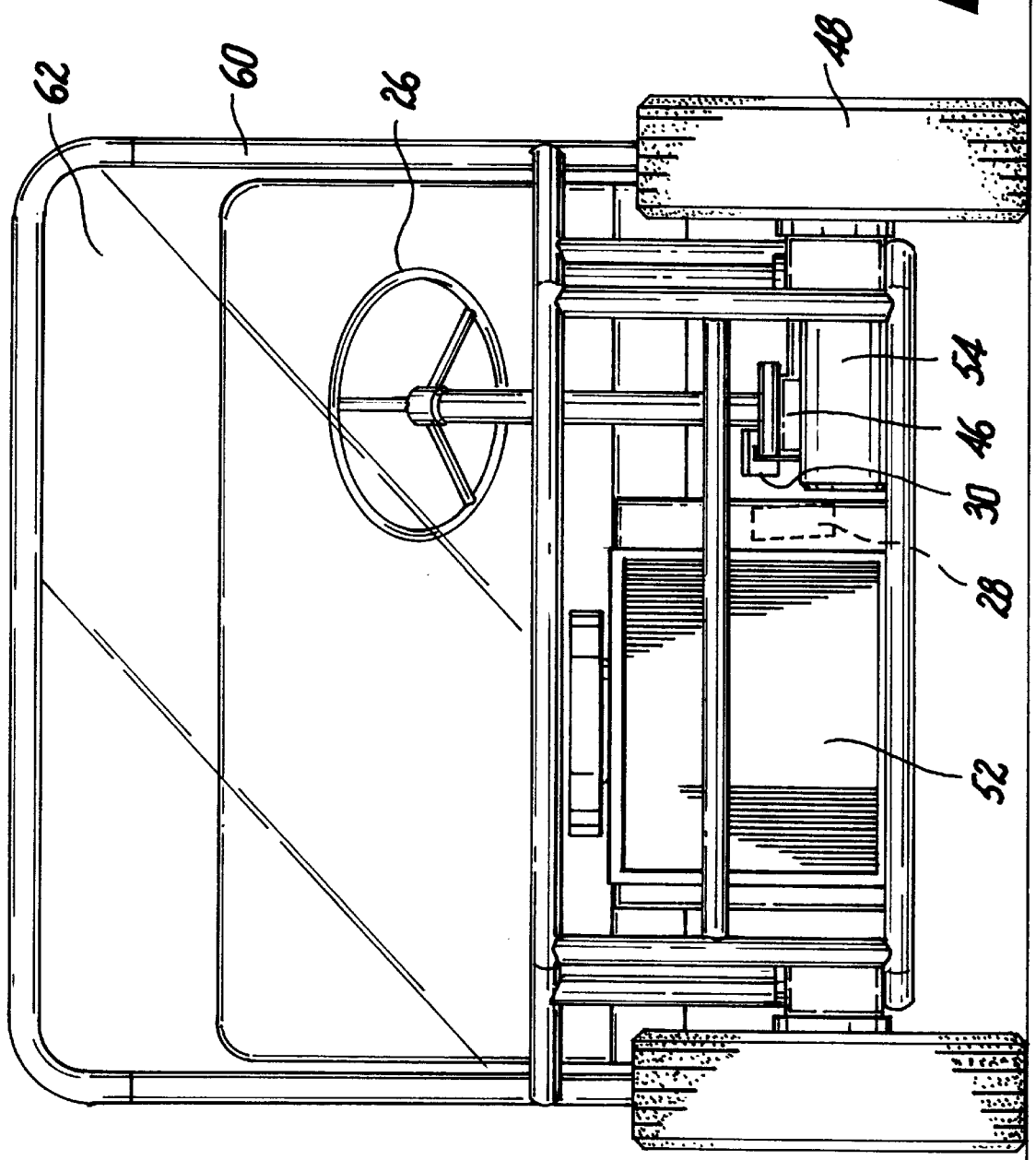
FIG. 4 is a front elevation view of the vehicle, according to the invention, showing details of an internal combustion engine, a generating system and a steering assembly.

Referring to FIGS. 1–3, a land vehicle 10 according to the invention is shown, including a frame 12 having a front section 14, a rear section 16 and a center section 18. Frame 12 supports all the components of the vehicle. Front section 14 is secured to central section 18 along a front end 20 of center section 18, while rear section 16 is secured to center section 18 along an opposing rear end 22 of center section 18.

According to a preferred embodiment of the invention, center section 18 functions as a cab and supports a seat 24, and driving controls including a steering wheel 26, an accelerator pedal 28 and a brake pedal 30 (which are described in greater detail below) and a set of batteries 32.

Rear section 16 preferably supports a set of drive wheels 33, three electric motors 34, 36 and 38 (of different torque), drive train 40, and rear suspension 42, as shown in FIG. 1. However some of these components may alternatively be attached to and supported by center frame 18, as shown in FIG. 2 wherein, for example, drive motors 34, 36 and 38 are attached to center frame 18 while batteries 32 are mounted in rear section 16. Rear section 16 may also support a fuel tank 44, as shown in FIG. 2.

Front section 14 preferably supports a steering assembly 46, a 6D set of wheels 48, front suspension 50 and optionally, an internal combustion (IC) engine 52, and an electric generator 54 (or alternator).

According to the invention, front section 14 is attached to center section 18 using any appropriate fastener, such as bolts or rivets, or fastening technique, such as welding or using an adhesive bond. Front section 14 may be displaced along front edge 20 (along a generally vertical axis 56) prior to being secured to center section 18 so that center section 18 may be vertically displaced with respect to front section 14 after securement thereto.

Similarly, rear section 16 is attachable to rear edge 22 of center section 18 using any appropriate fastener, such as bolts or rivets, or fastening technique, such as welding or adhesive bonding. Rear section 16 may be displaced along rear edge 22 (along a generally vertical axis 59) prior to being secure to center section 18 so that center section 18 may be vertically displaced with respect to rear section 16 after securement thereto. In a preferred embodiment, each frame section includes spaced interlocking tubular elements 21 that selectively mate with adjacent elements 21 at a desired vertical displacement with respect to each other. Engaged tubular elements form a common and aligned tube through which a frame element 60, 66 (described below) may be inserted. Insertion of frame element 60, 66 into the aligned tube (established by aligned tubular elements 21), secures adjacent frame sections together and correctly positions one frame section with respect to another.

Frame 12 may be easily assembled by simply attaching separately assembled front, center and rear sections together using simple techniques, described above. By allowing front section 14 and rear section 16 to be independently vertically displaced with respect to center section 18, a variety of modified vehicle frames may be quickly and easily manufactured according to the specific requirements of the customer.

According to another aspect of the invention, it is preferred that each frame section 14, 16, 18, be assembled independently and thereafter assembled together during the manufacture of the vehicle 10, according to the specific requirements of the customer. For example, if a customer needs an electric or hybrid vehicle that can haul heavy loads, then a front section 14 already manufactured with a higher-output generator 54 and a stronger IC engine 52 will be selected and attached to a pre-made single seat center section 18, and a pre-made rear section 16 having a pick-up truck style bed and stronger or specific high-torque drive motors 34, 36, 38 will be selected and attached to center section 18 so that the desired vehicle 10 may be quickly and easily manufactured as needed. In such instance, it may be necessary to raise rear section 16 with respect to center section 18 prior to attaching the two sections together.

As an example to illustrate the versatility of the vehicle of the present invention, to provide an electric passenger-transport vehicle, a center section 18 having several seats is chosen and attached to a front section 14 having a high-output generator 54 and a stronger IC engine 52, and further attached to a rear section 16 having powerful motors 34, 36, 38.

Should a customer require an electric vehicle adapted for farm-use in harvesting crops in a field, the manufacturer would choose a center section 18 having a long flat platform and attach it to a front section 14 having a high-output generator 54 with a strong IC engine 52. A rear section 16 having power drive motors 34, 36, 38 and perhaps larger drive wheels 33 that are designed to negotiate the loose and sometimes muddy soil terrain would be selected and attached to center section 18 to complete the vehicle. In this case, rear section 16 will be attached to center section 18 in a higher position to accommodate the larger drive wheels 33. Farm workers may comfortably lay down the flat platform of center section 18 and harvest crops as vehicle 10 is driven slowly through fields.

To provide an electric vehicle that may be driven to a location and used to support a worker at an elevated site, a center section 18 having a single seat may be selected in combination with a rear section 16 that already has a "cherry-picker" type raisable platform incorporate in its design, including the necessary hydraulic and/or electric drives used to operate the raisable platform, and a front section 14 having a high-output generator 54 and a strong IC engine 52.

To provide a business commuter with a simple, inexpensive electric vehicle to function as short-distance transportation for one person, a small lightweight center section 18 having a single seat 24, a heater (not shown), and a coffee-cup holder (not shown) is selected and attached to a front section 14 having an efficient and low cost generator 54 and a fuel efficient IC engine 52 and a comfortable suspension 50. A rear section 16 having efficient drive motors 34, 36, 38 and a comfortable suspension 42 would be chosen and attached to center section 18.

The above examples illustrate that since the actual structure of the vehicle may be simply and easily assembled, a great number of different types of vehicles may be manufactured quickly and easily. Furthermore, by separating the vehicle into distinct inter-fitting sections, each section may be manufactured at a different location and perhaps by different companies. For example, as a car manufacturer assembles center sections and basic front and rear sections, the John Deere Company, for example, could manufacture front sections 14 having attachable plows and snow blowers, and rear sections 16 having integral earth-moving implements. These special front and rear sections could be readily available to the car manufacture to quickly incorporate them into a vehicle according to a specific customer's requirements.

Although it is preferred that each section be only initially adjustable just prior to manufacturing a specific-type vehicle, according to another aspect of the invention, each section (front, rear and center) may be vertically adjusted with respect to each other and/or interchanged with other or different sections after manufacture and by the owner (or user) of the vehicle. This feature not only allows a person to quickly and easily modify the effective ride height of front and rear frame sections 14, 16 with respect to center section 18, but further allows each section to be removed and re-attached, in the field if necessary. With this arrangement, a farmer, for example, may purchase a basic vehicle, and later purchase specific "task" frame sections, such as a rear section having a water tank for spraying crops, or a front section having a harvesting implement, and modify the basic vehicle to meet his changing requirements. Also, a specific section may be removed and sent to a mechanic for repair, without having to tow the entire vehicle. In such instance, the mechanic could provide aa temporary section (or a replacement section) as the damaged one is repaired.

Although each frame section according to the invention will be different in construction, it is preferred that each frame section includes a simple box-frame construction, including various horizontal members 55 and vertical members 57 that are either fastened directly to each other or secured using a joint. Depending on the type of materials used, members 55, 57 may be welded, bolted, riveted or glued together to form each frame section 14, 16, 18.

Figure 5:
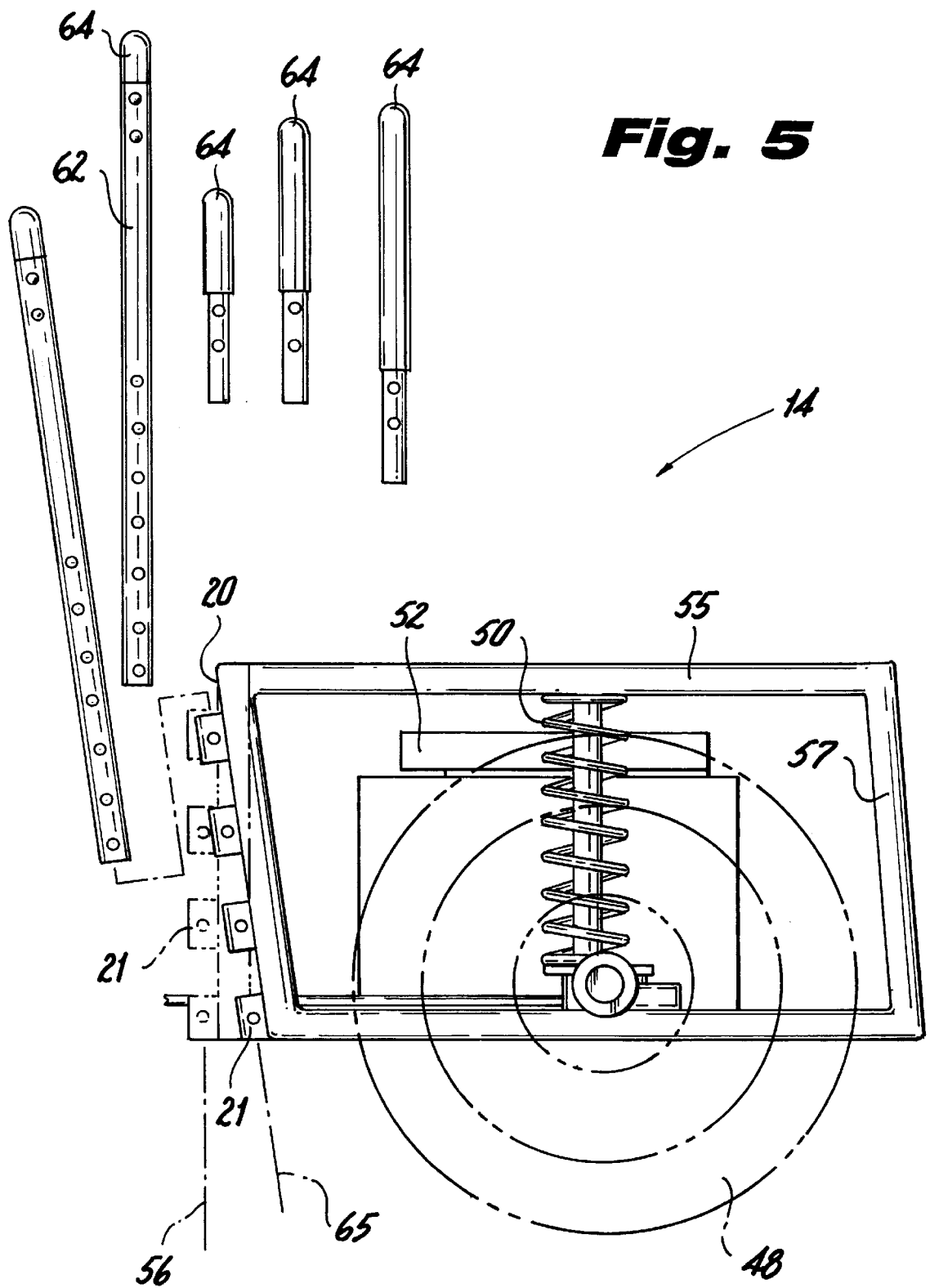
FIG. 5 is a side elevation view of the front section, according to the invention, showing details of an adjustable frame-connection system.

As described above, front section 14 is attached to center section 18 along a front edge 20. Also attached along front edge 20 is a front window frame 60, as shown in FIG. 5, used to support a windshield 62 and includes a cross member 64. Depending on the specific application of vehicle 10, cross member 64 of window frame 60 may further include extension ends of various lengths which may be selectively attached to an upper end of front window frame 60 as necessary, using any appropriate fastening techniques, such as bolts or rivets. As shown in FIG. 5, front window frame 60 may be attached to front section 14 along an edge 65 that is angled with respect to front edge 20 so that front window frame 60 and windshield 62 may be angled to reduce drag caused by wind as vehicle 10 travels.

Figure 6:
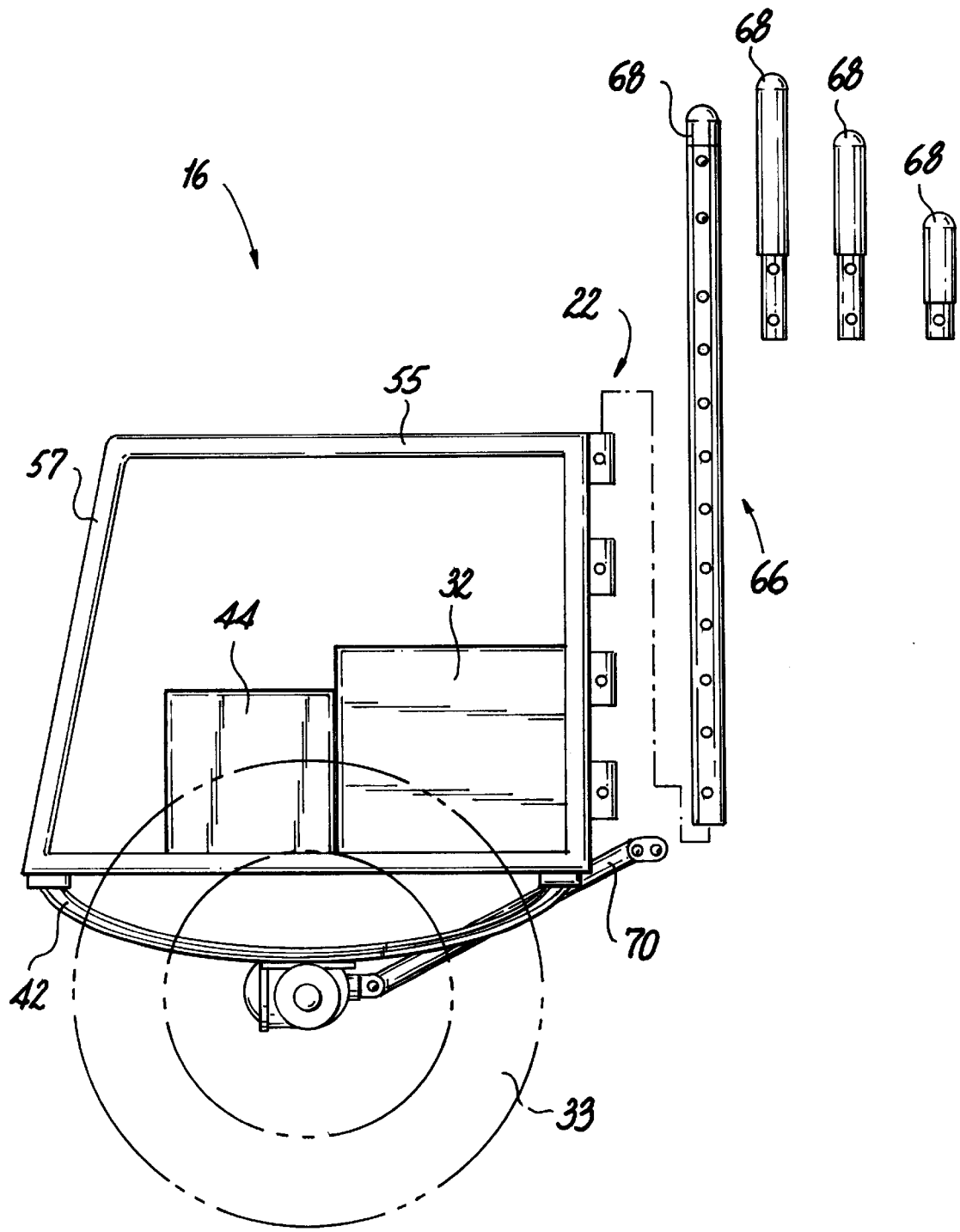
FIG. 6 is a side elevation view of the rear section, according to the invention, showing details of the adjustable frame-connection system, frame extension pieces, and batteries.

Similarly, as shown in FIG. 6, rear section 16 is attached to center section 18 along rear edge 22 and preferably includes a rear window frame 66 which supports a window (not shown) and cross member 68. Again, depending on the specific application of vehicle 10, cross member 68 of rear window frame 66 may further include extension ends of various lengths which may be selectively attached to an upper end of rear window frame 66 as necessary, using any appropriate fastening techniques, such as bolts or rivets.

Depending on the particular application, members 55, 57 are preferably made from an inexpensive, rigid, lightweight material, such metal tubing, bamboo or other types of wood. Each member 55, 57 of each frame section is secured end-to-end, end-to-edge, or edge-to-edge using any appropriate connector or adhesive (not shown). Preferred connectors include clamp-type connectors that allow each frame member may be quickly and easily adjusted or replaced, as necessary. Appropriate connectors are well known in the art and are therefore not shown or described in great detail.

Should a single member 55, 57 become damaged in the field, the driver may simply loosen the appropriate clamp-type connectors, remove the damaged member 55, 57, and replace it with another member 55, 57 (either a spare one or one made from environmental resources). Clamp-type connectors may include additional fasteners that penetrate members 55, 57 to provide additional strength and to allow for quick and easy alignment during a repair or modification.

As in hybrid vehicles of the prior art, generator 54 is mechanically connected to the output crank shaft of IC engine 52 so that IC engine 52 may rotate generator 54 and generate electricity in a manner and arrangement that is well known to those of ordinary skill in the art. The purpose of IC engine 52 and generator 54 is to charge batteries 32 so that vehicle 10 may travel a greater distance without stopping for fuel. As is well known in the art, such hybrid vehicles further include appropriate current regulators (not shown) to control the flow of current between generator 54 and batteries 32 so that a predetermined level of battery charge is maintained, regardless of the current demand to drive motors 34, 36, 38. Details of known motor controllers and current regulators are not described.

Of course, depending on the specific type of drive motors 34, 36, 38 and generator 54 used, power generated by generator 54 may be directly applied to drive motors 34, 36, 38 to meet a high current demand period of operation, such as during the pulling of a heavy load or ascending an inclined terrain. During such a high current demand, electrically powered cooling fans (not shown) may be activated to provide additional cooling to drive motors 34, 36, 38 and other electrical equipment, as required. Furthermore, although IC engine 52 is ideally restricted to an efficient operating range of speed (higher power output with the lowest fuel consumption), for example about 1500 RPM, the speed of IC engine 52 may be adjusted either automatically or manually according to the power demands of the vehicle in travel, as is known in the art.

According to a preferred embodiment, vehicle 10 preferably includes three drive motors, a high-torque motor 36, and high-speed, continuous drive motors 34, 38.

Each motor 34, 36, 38 is independently connected to batteries 32, and a speed controller (not shown). In a preferred embodiment, shown in FIGS. 2 and 3, motor 34 is attached directly to a common drive shaft 70 through a clutch 72 (either electro-magnetic or centrifugal) so that operation of motor 34 will rotate common drive shaft 70 at a first rate when clutch 72 is engaged.

Motor 36 is mechanically attached to common drive shaft 70 using a belt or chain 74, a small-diameter transmission sprocket 76, a large diameter transmission sprocket 78, and a clutch 80. Large sprocket 78 is attached to common drive shaft 70, while small sprocket 76 is attached to the output shaft of motor 36, through clutch 80. Chain or belt 74 connected large and small sprockets 76, 78 so that operation of motor 36 will selectively rotate common drive shaft 70 at a second rate only when clutch 80 is engaged.

Motor 38 is connected to common drive shaft 70 and includes a clutch 82 connected to a sprocket 84, which in turn is connected to a sprocket 86, by a chain or belt 88. Sprocket 86 is attached to drive shaft 70 so that, as in the above-described arrangement of motor 36, operation of motor 38 will rotate common drive shaft 70 at a third rate, when clutch 82 is engaged.

Common drive shaft 70 is mechanically connected to a differential 71, which translates rotational displacement of common drive shaft 70 to rotational displacement of two outwardly directed half-shafts 73, which are mechanically attached to rear drive wheels 33, as is well known in the art.

Figure 11:
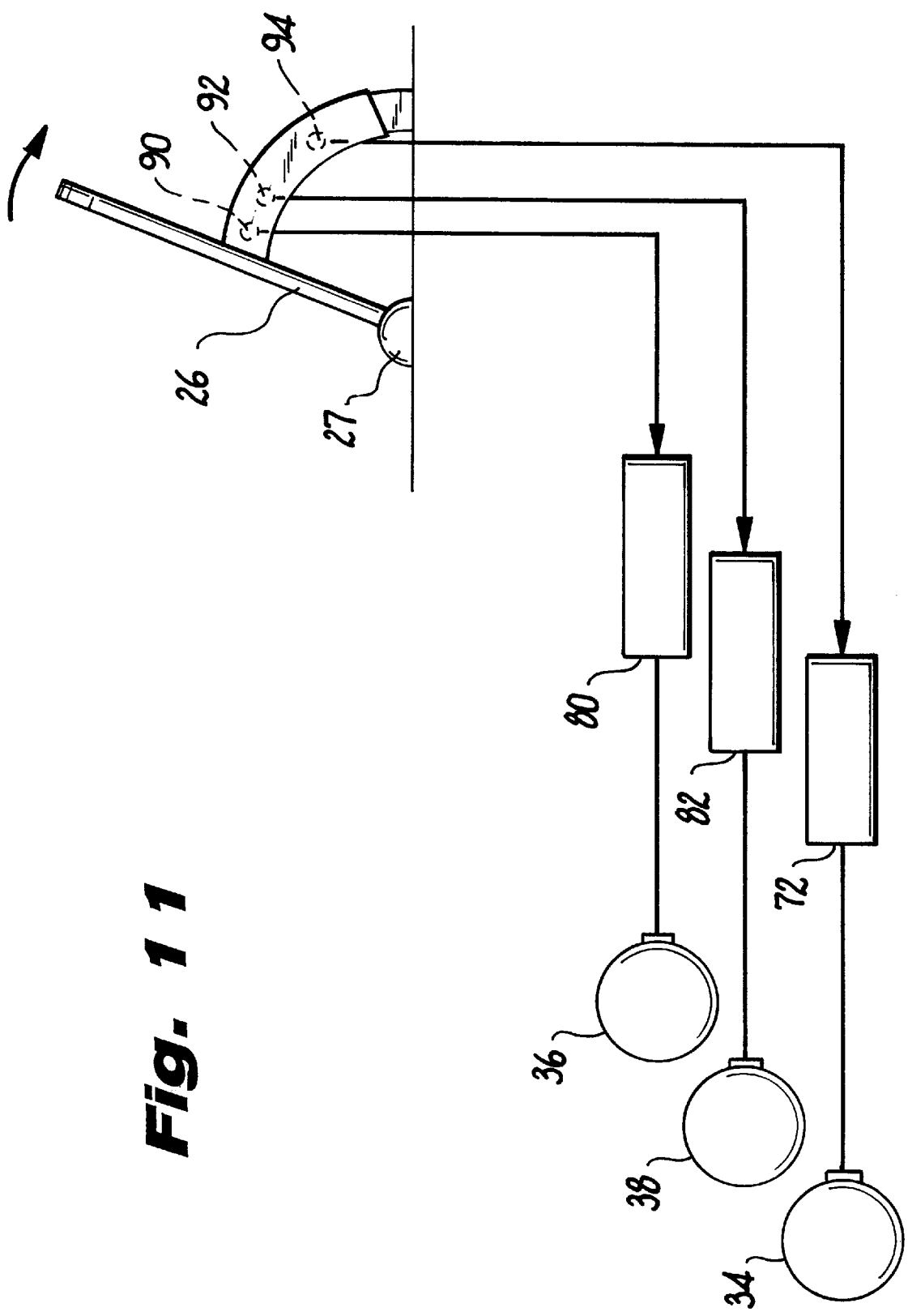
FIG. 11 is a schematic of a motor controller system, according to the invention.

Referring to FIG. 11, acceleration pedal 26 is pivotal about a base 27 between a raised position and a depressed position, and actuates three switches 90, 92, 94 at different points of its travel. Switch 90 is used to electrically activate clutch 80 of high torque motor 36 and simultaneously activate a power relay (not shown) to supply power to motor 36 so that only motor 36 will rotate common drive shaft 70 and propel vehicle 10 from rest to a predetermined speed. As pedal 26 is further depressed, switch 92 will actuate and switch 90 will be cutoff. Switch 92 will electrically activate (close) clutch 82 of motor 38 and simultaneously activate a relay (not shown) to power motor 38. Actuating switch 92 will cause motor 38 to rotate common drive shaft 70 through energized clutch 82 at the second, faster rate, thereby propelling vehicle 10 faster.

Finally, should more speed be desired, as pedal 26 is fully depressed, switch 94 is actuated which disengages switch 92 and turns off motor 38, and engages clutch 72 and motor 34 which will directed drive common drive shaft 70 at the fastest rate.

If pedal 26 is raised, all motors 34, 36, 38 are preferably de-energized and all clutches 72, 80, 82 are mechanically opened (electrically cutoff) so that vehicle 10 may coast or stop, as desired.

Depending on the specific type of vehicle 10, the drive motors may be directly connected by a chain or belt 70 to a drive wheel 33 (see FIG. 2) in which case only a single wheel 33 will be driven, or connected to a common drive shaft 72, as preferred and described above and shown in FIGS. 2 and 3.

The specific transmission ratio between motors 34, 36 38 and common drive shaft 70 will vary depending on the specific types of motors used and power requirements of vehicle 10, as illustrated above.

Engine 52 may include a local fuel tank (not shown) or a remote tank 44 located in rear section 16, as shown in FIGS. 6 and 7.

Vehicle 10 may include appropriate braking system, as is well known, which may be mechanical, hydraulic, or pneumatic, depending on the type of vehicle 10 and its intended use.

Suspension system 50 is preferably a McPherson type suspension that includes a coil dampening spring around a shock-absorber. This type of suspension is connected to a front hub assembly and allows the front wheels to be steered as they are independently linearly translated to dampen vibrations and movements caused by rough roads.

The types of wheels used with vehicle 10 may be conventional and specific to the desired application of the vehicle. Wheels 33, 48 may be attached to appropriate hubs (as known in the art), in a conventional manner such as through the use of lug-nuts or bolts. However, according to another aspect of the invention, wheels 33, 48 are preferably attached to their respective hubs using a quick-release assembly, according to the invention and shown in FIGS. 8, 9, and 10.

Figure 10:
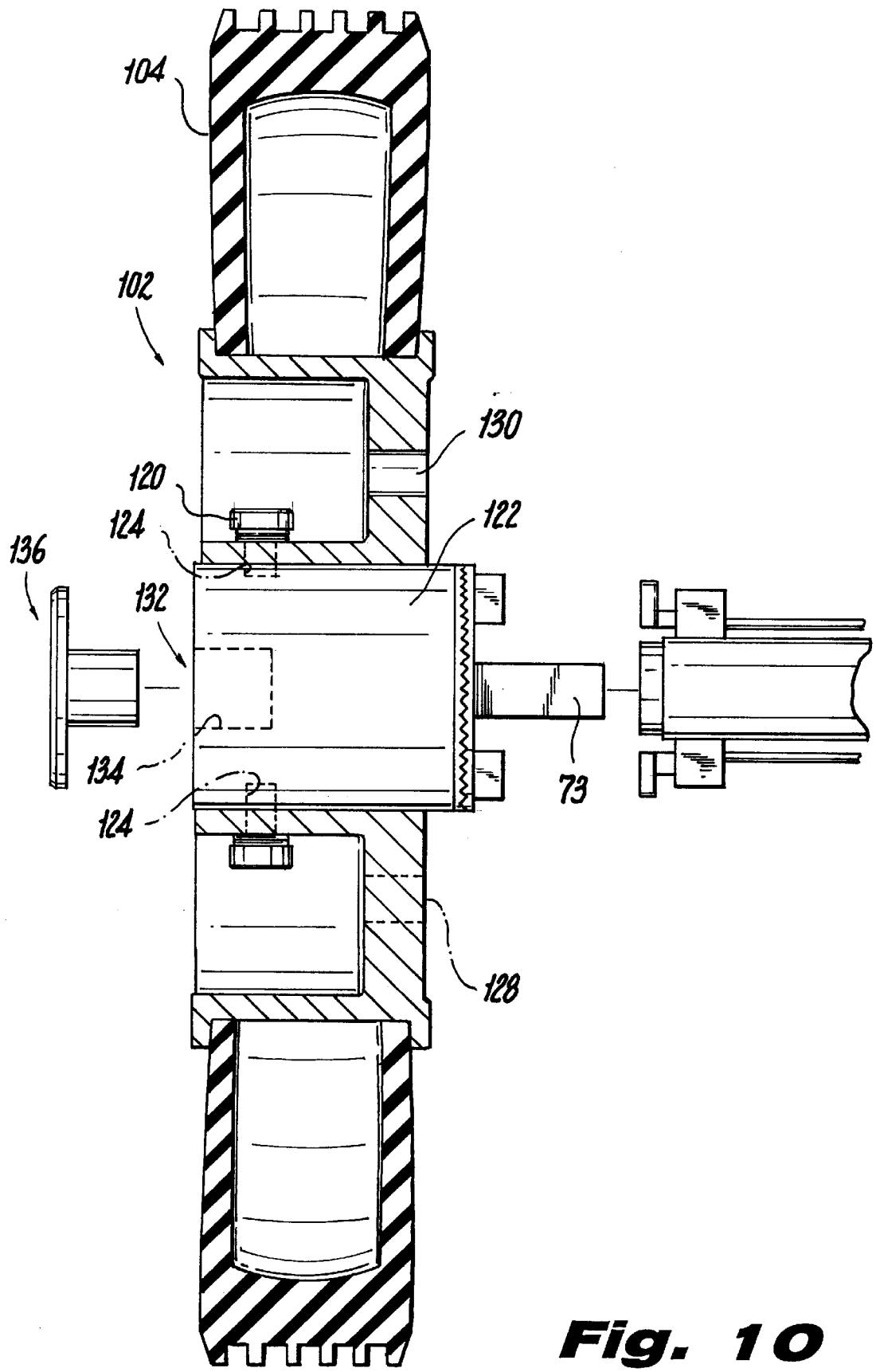
FIG. 10 is a side assembly view of the wheel assembly, according to the invention, showing details of a connecting hub.

Referring to FIGS. 8, 9, and 10, a wheel assembly 100 is shown including a rim 102 and an inter-fitting tire 104. Rim 102 includes a peripheral wall 106 that is adapted to tightly receive tire 104 in a conventional manner. Rim 102 further includes a large central opening 108 defined by a inner wall 110. Inner wall 110 and peripheral wall 106 define a circular channel 112 that is concentric to central opening 108 and includes a front open end 114 and a back wall 116. Back wall 116 connected inner wall 110 and peripheral wall 106 together, as shown in FIG. 9. Inner wall 110 includes radially directed openings 118 that are adapted to receive a securing pin 120.

Central opening 108 is adapted to snugly receive a cylindrical hub 122 having a similarly shaped section. Hub 122 includes radially directed openings 124 that are sized and shaped to receive pin 120. Using a transversely oriented pin 126, and appropriate openings 128, 130, hub 122 is attached to either half shaft 73, as shown in FIG. 10, or to a bearing assembly (to freely rotate) located in front section 14. Hub 122 includes an outer opening 132 that provides access to an inner wall surface 134. An end cap 136 may be provided to seal opening 132.

In operation of the quick release wheel arrangement shown in FIGS. 8, 9 and 10, if a wheel 100 is to be removed, vehicle 10 is raised to lift wheel 100 above the ground. End cap 136 is pried from opening 132 and pins 120 are removed from openings 118 and 124. Pins 120 are preferably spring-loaded pins that are attached to inner wall 110 and are spring-biased radially inwardly into engagement openings 124 of hub 122. In this instance, pins 120 are simply pulled from openings 124 of hub 122 so that wheel assembly 100 may be slide off of hub 122 and replaced. This arrangement allows a user to quickly and easily change a wheel assembly 100, perhaps to fix a flat tire, or to quickly modify vehicle 10 to perform different tasks, such as provide wider tires 104 (having similar openings 108) so that vehicle 10 may be driven over sand, for example.

What is claimed is:

1. A modular vehicle comprising:

a body having a first and second frame assembly;

said first frame assembly being slidably adjustable with respect to said second frame assembly along a generally vertical axis so that said first frame assembly may be vertically displaced with respect to said second frame assembly; and a drive wheel assembly including at least one wheel being mounted to said first frame.

2. A vehicle operable by a driver, said vehicle comprising:

a body having at least two wheels;

a drive train mounted to said body and connected to at least one of said two wheels;

a first drive motor mounted to said body and having a rotatable output shaft, said operation of said motor being controlled by a first motor controller;

a first clutch connected between said output shaft of said first drive motor and said drive train for selectively controlling mechanical connection of said output shaft of said first motor with said drive train, said first clutch being engagable between an engaged position and a disengaged position;

a second drive motor mounted to said body and having a rotatable output shaft, said operation of said second motor being controlled by a second motor controller;

a second clutch connected between said output shaft of said second motor and said drive train for selectively controlling mechanical connection of said output shaft of said second motor, said second clutch being engagable between an engaged position and a disengaged position, said first and second clutches being independently operational to selectively engage either or both of said motors with said drive train; and a speed sensor for detecting a desired vehicle speed according to said driver, said speed sensor controlling said operation of said first and second motor controller and first and second clutches so that any combination of said first and second motors may be selectively engaged with said drive train to ensure that said vehicle reaches and maintains said desired vehicle speed.

3. A vehicle comprising:

a body having at least two wheels;

a drive train mounted to said body and connected to at least one of said two wheels;

a first drive motor mounted to said body and having a rotatable output shaft, said operation of said motor being controlled by a first motor controller;

a first clutch connected between said output shaft of said first drive motor and said drive train for selectively controlling mechanical connection of said output shaft of said first motor with said drive train, said first clutch being engagable between an engaged position and a disengaged position;

a second drive motor mounted to said body and having a rotatable output shaft, said operation of said second motor being controlled by a second motor controller; and a second clutch connected between said output shaft of said second motor and said drive train for selectively controlling mechanical connection of said output shaft of said second motor, said second clutch being engagable between an engaged position and a disengaged position, said first and second clutches being independently operational to selectively engage either or both of said motors with said drive train.

4. The vehicle according to claim 2, wherein said first motor provides high torque, relative to said second motor.

5. The vehicle according to claim 3, wherein said first motor provides high torque, relative to said second motor.

6. The vehicle according to claim 2, further comprising a third motor which is mounted to said body and which includes an output shaft, and a third clutch mechanically connected between said output shaft of said third motor and said drive train, said first, second, and third motors operating selectively to provide required torque to said vehicle to ensure that said desired speed is reached and maintained.

7. The vehicle according to claim 3, further comprising a third motor which is mounted to said body and which includes an output shaft, and a third clutch mechanically connected between said output shaft of said third motor and said drive train, said first, second, and third motors operating selectively to provide required torque to said vehicle to ensure that a desired speed of said vehicle is reached and maintained.

8. The vehicle according to claim 3, wherein said drive train includes a mechanical differential for distributing rotational displacement from any of said first and second motors to both of said wheels.

9. The vehicle according to claim 3, wherein said drive train includes a chain mechanically connecting said at least one of two wheels with any of said output shafts of said first and second motors.

10. The modular vehicle according to claim 1, wherein said first and second frame assemblies are made from tubing.

11. The modular vehicle according to claim 1, wherein said first frame assembly and said second frame assembly have a generally vertical attaching surface against which both frame assemblies are connected, said first and second frame assemblies each include engagement elements along said attachment surface, said engagement elements of each frame assembly are sized and shaped to interlock with each other at predetermined relative vertical displacement between said first and second frame assemblies.

12. The modular vehicle according to claim 11, further comprising a locking member used to engage and lock together all of said engagement elements so that said first and second frame assemblies may be locked to each other at a predetermined relative vertical displacement.

13. The modular vehicle according to claim 11, further comprising means to select engagement of each engagement element to vertically displace said first frame assembly with respect to said second frame assembly.

14. The modular vehicle according to claim 1, wherein said first frame assembly is a drive frame assembly and includes at least two drive motors, a drive train, and at least one drive wheel.

15. The modular vehicle according to claim 1, wherein said second frame assembly is a passenger cab suitable for supporting a driver of said vehicle.

16. The modular vehicle according to claim 1, further comprising a third frame assembly which is secured to either or both of said first and second frame assemblies.

17. The modular vehicle according to claim 16, wherein said third frame assembly is slidably adjustable along a vertical axis with respect to either or both of said first and second frame assemblies.

* * * * *